US 6,658,956 B2

(12) United States Patent
Laurandel

(10) Patent No.: US 6,658,956 B2
(45) Date of Patent: Dec. 9, 2003

(54) MOTORIZED REDUCTION GEAR INTENDED FOR FUNCTIONAL EQUIPMENT OF MOTOR VEHICLES

(75) Inventor: Hervé Laurandel, Herouville Saint Clair (FR)

(73) Assignee: ArvinMeritor Light Vehicle Systems (FR)

(*) Notice: Subject to any disclaimer, the term of this patent is extended or adjusted under 35 U.S.C. 154(b) by 59 days.

(21) Appl. No.: 09/758,907

(22) Filed: Jan. 11, 2001

(65) Prior Publication Data

US 2001/0009114 A1 Jul. 26, 2001

(30) Foreign Application Priority Data

Jan. 11, 2000 (FR) ............................................. 00 00292

(51) Int. Cl.[7] ................................................. F16H 1/16
(52) U.S. Cl. ......................................... 74/425; 277/910
(58) Field of Search ........................... 74/425; 277/910; 310/88, 85, 90, 233; 384/145, 130

(56) References Cited

U.S. PATENT DOCUMENTS

| 3,232,681 A | * | 2/1966 | Mittmann ................... 384/145 |
| 3,506,315 A | * | 4/1970 | Young, Jr. ................... 384/208 |
| 3,897,178 A | * | 7/1975 | Palloch ....................... 417/368 |
| 4,060,287 A | * | 11/1977 | Orkin ........................... 384/208 |
| 4,519,614 A | * | 5/1985 | Garner ........................ 277/500 |
| 4,619,588 A | * | 10/1986 | Moore, III .................... 417/366 |
| 5,414,316 A | * | 5/1995 | Michel et al. ................. 310/90 |
| 5,470,158 A | * | 11/1995 | McLarty et al. ............. 384/484 |

FOREIGN PATENT DOCUMENTS

| EP | 0509263 | 10/1992 |
| FR | 2196540 | 3/1974 |

* cited by examiner

Primary Examiner—David Fenstermacher
(74) Attorney, Agent, or Firm—Carlson, Gaskey & Olds

(57) ABSTRACT

Motorized reduction gear intended for functional equipment of motor vehicles, such as window lifters, sunroofs or seats, comprising a rotor provided with a rotor shaft bearing a commutator and passing through a rolling bearing housed in a support of a reduction gearbox in which the said shaft is placed, and a worm of the shaft engaging with a gearwheel housed in the reduction gearbox. A seal is inserted between the bearing and the bearing support, on the side of the bearing close to the inside of the reduction gearbox. An annular housing, the profile of which is adapted to receive the seal resting on a spherical surface of the bearing, is arranged in the wall of the bearing support. The presence of the seal prevents any leak of lubricant out of the gearbox thus ensuring a better longevity of the brushes of the commutator.

9 Claims, 2 Drawing Sheets

MOTORIZED REDUCTION GEAR INTENDED FOR FUNCTIONAL EQUIPMENT OF MOTOR VEHICLES

BACKGROUND OF THE INVENTION

The subject of the present invention is a motorized reduction gear intended for functional equipment of motor vehicles, such as window lifters, sunroofs or seats.

Such a motorized reduction gear comprises a stator housed in a casing and a rotor provided with a rotor shaft bearing a commutator and passing through a rolling bearing housed in a support of a reduction gearbox. The rotor shaft is placed in the reduction gearbox and comprises a worm engaging with a gearwheel housed in the reduction gearbox, this gearing being appropriately lubricated by grease or oil. Frequently, the motorized reduction gear is placed with its rotor shaft and its rotor arranged substantially vertically.

It has been found that after a certain period of use of this motorized reduction gear, there is premature wear of the brushes sliding on the commutator because of the presence of lubricant thereon, as a result of leaks of lubricant from the internal gearing into the reduction gearbox.

This is because, given the vertical arrangement of the motorized reduction gear, the commutator and the brushes are placed below the reduction gearbox, its worm and the gearwheel. In addition, the high operating temperature of the motorized reduction gear encourages oil or grease to leak out of the reduction gearbox, between the reduction gearbox and the rolling bearing.

SUMMARY OF THE INVENTION

The object of the invention is to propose a motorized reduction gear in which any leak of lubricant from the inside of the reduction gearbox is eliminated, thus encouraging an increased longevity of the commutator brushes.

According to the invention, a seal is inserted between the bearing and the bearing support, on the side of the bearing close to the inside of the reduction gearbox.

This seal may be an O-ring or equivalent, and has a hardness appropriate to the ball-joint action of the shaft (self-alignment of the shaft with the bottom bearing of the stator).

Under these conditions, any inadvertent leak of lubricant from inside the reduction gearbox is eliminated.

BRIEF DESCRIPTION OF THE DRAWINGS

Other particular features and advantages of the invention will appear during the following description, given with reference to the appended drawing which illustrates a form of embodiment thereof, by way of non-limiting example.

DETAILED DESCRIPTION OF THE PREFERRED EMBODIMENT

Figure 1:
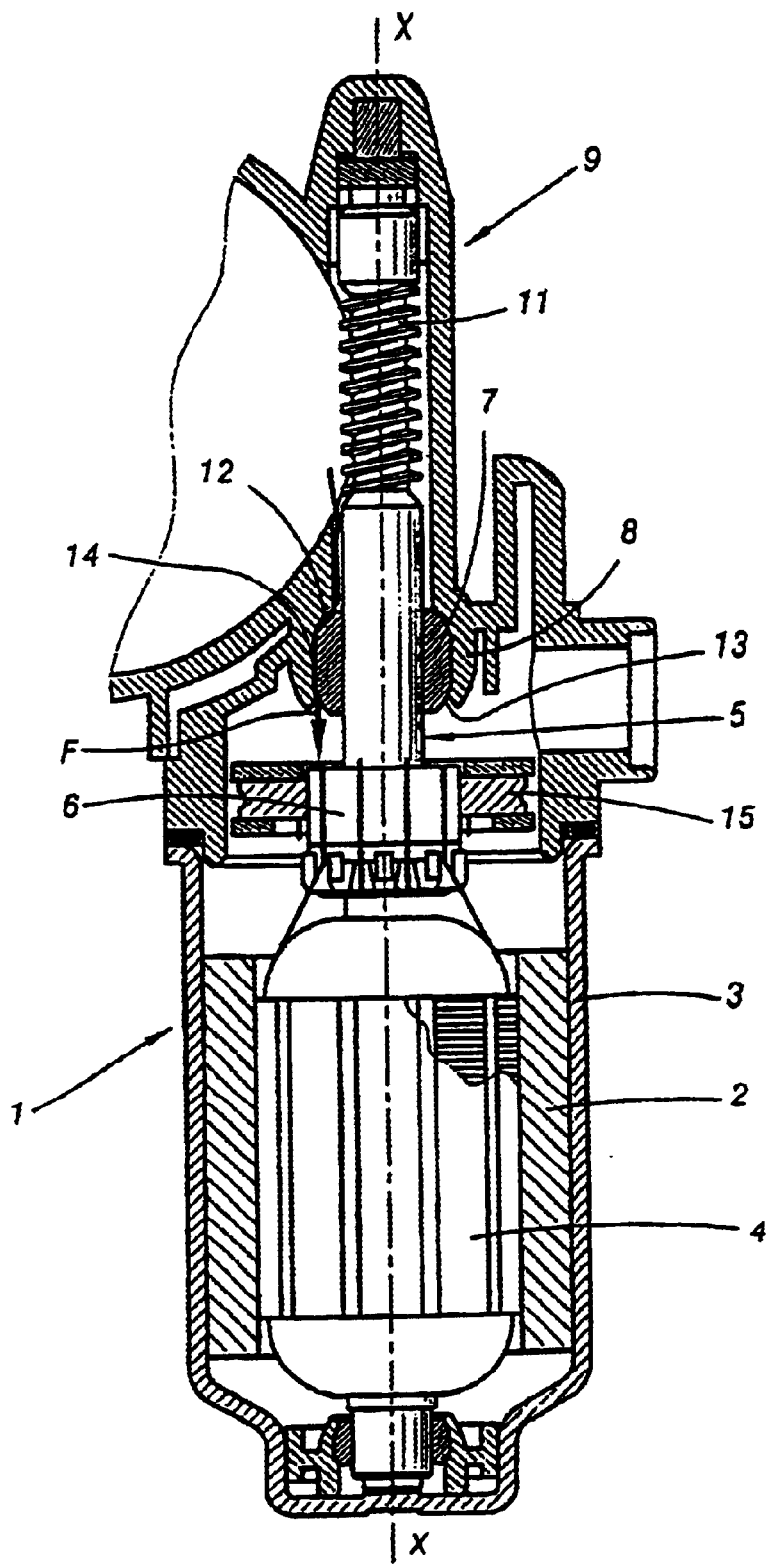
FIG. 1 is a view in partial longitudinal section, substantially to scale, of a motorized reduction gear according to the prior art of the invention.

The motorized reduction gear 1 illustrated in FIG. 1 is intended for functional equipment of motor vehicles such as window lifters or sunroofs.

The reduction gear 10 comprises a stator 2 housed in a casing 3, a rotor 4 placed inside the stator 2, provided with a rotor shaft 5 bearing a commutator 6 and passing through a rolling bearing 7 housed in a support 8 of a reduction gearbox 9 in which the shaft 5 is placed. The commutator 6 engages with brushes 15. The shaft 5 comprises, inside the gearbox 9, a worm 11 engaging with a gearwheel (not shown) also housed in the reduction gearbox 9.

The reduction gearbox 9 contains a lubricant (grease, oil) for the gearing formed by the worm 11 and the gearwheel. The rotor shaft 5 and the rotor 4 have a longitudinal axis XX oriented vertically when the motorized reduction gear is thus arranged, in window lifters of vehicles or other functional equipment.

The rolling bearing 7 has, at its opposite ends, spherical surfaces 12, 13 connected by a central cylindrical surface 14, these various surfaces 12, 13, 14 being seated on bearing surfaces with complementary profiles belonging to the bearing support 8. It is found that, with such an arrangement, there is premature wear of the brushes 15 following a leak of lubricant from the inside of the reduction gearbox 9 between the bearing 7 and the support 8, this leak being indicated by the arrow F in FIG. 1.

Figure 2:
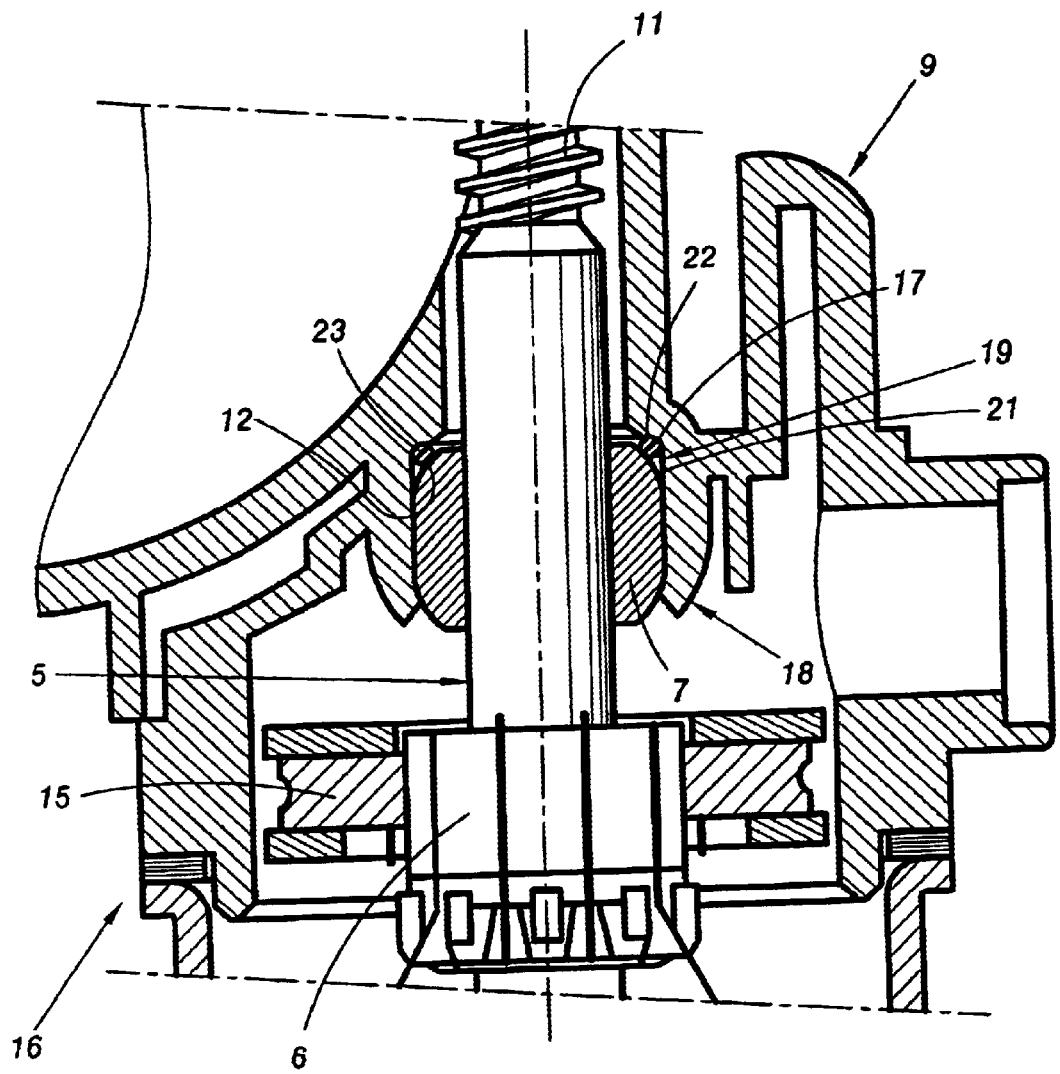
FIG. 2 is a view in partial longitudinal section, on an enlarged scale compared to FIG. 1, of a form of embodiment of the motorized reduction gear according to the invention.

In the motorized reduction gear 16 according to the invention, illustrated in FIG. 2, a seal 17 is inserted between the rolling bearing 7 and the bearing support 18, on the side of the bearing 7 close to the inside of the gearbox 9.

An annular housing 19 is arranged in the wall of the bearing support 18, the profile of which housing is adapted to receive in a leaktight manner the seal 17, which is placed to rest on the corresponding spherical surface 12 of the bearing 7. The seal 17 may be an O-ring, as shown, or have a different profile, for example may have a lip. The wall of the housing 19 has two surfaces 21, 22 which are substantially perpendicular and connected by a rounded central bearing surface 23 against which the seal 17 rests. Preferably, the bearing surface 23 forming the bottom of the housing 19 has a spherical profile which is the complement of that of the seal 17.

The seal 17 has a Shore A hardness appropriate to the ball-joint action of the rotor shaft 5, that is to say, preferably from 30 to 50.

It is found that under these conditions, in spite of the vertical arrangement of the motorized reduction gear 16 and the heating of the lubricant to high temperatures, there is no longer any leak from the inside of the reduction gear box 9 to the commutator 6. This is because the combination of the seal 17 and the profile of its housing 19 efficiently counter any leak of lubricant between the bearing 7 and the support 18. This results in an extension of the longevity of the brushes 15, the wear of which is notably reduced.

The seal 17 and the housing 19 can be replaced by a seal and a housing of different profiles, which are complementary to each other.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A motorized reduction gear for functional equipment of a motor vehicle comprising:

a rotor provided with a rotor shaft bearing a commutator and passing through a bearing housed in a support of a reduction gearbox in which said shaft is placed; and a worm of said shaft engaging with a gearwheel housed in said reduction gearbox, wherein a seal is inserted between said bearing and said support on a side of said bearing proximate to an inside of said reduction gearbox, and rests on a spherical surface of said bearing and on a wall of said support having a cross sectional profile taken along an axis of said rotor shaft of two substantially perpendicular surfaces connected by a rounded central bearing surface.

2. The motorized reduction gear as recited in claim 1 further including an annular housing having a profile adapted to receive said seal is arranged in a wall of said support.

3. The motorized reduction gear as recited in claim 2 wherein said annular housing contains a lubricant.

4. The motorized reduction gear as recited in claim 1 wherein said seal is in contact only with said support and said spherical surface of said bearing.

5. The motorized reduction gear as recited in claim 1 wherein said seal is an O-ring.

6. The motorized reduction gear as recited in claim 1 wherein said rounded central bearing surfaces has a profile which complements a profile of said seal.

7. The motorized reduction gear as recited in claim 1 wherein said seal rests on said two substantially perpendicular surfaces.

8. The motorized reduction gear as recited in claim 1 wherein the functional equipment is a window lifter.

9. The motorized reduction gear as recited in claim 1 wherein the functional equipment is a sunroof.

* * * * *